(12) United States Patent
Nagai

(10) Patent No.: US 7,085,302 B2
(45) Date of Patent: Aug. 1, 2006

(54) LASER APPARATUS, EXPOSURE APPARATUS AND METHOD

(75) Inventor: Yoshiyuki Nagai, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/354,658

(22) Filed: Jan. 30, 2003

(65) Prior Publication Data
US 2003/0142715 A1 Jul. 31, 2003

(30) Foreign Application Priority Data
Jan. 31, 2002 (JP) ........................... 2002-023632

(51) Int. Cl.
H01S 3/22 (2006.01)
H01S 3/223 (2006.01)

(52) U.S. Cl. .................. 372/55; 372/56; 372/57; 372/58; 372/59

(58) Field of Classification Search ............. 372/55, 372/59, 57, 29.011, 36.01, 56, 58, 60, 90
See application file for complete search history.

(56) References Cited

U.S. PATENT DOCUMENTS

| | | | |
|---|---|---|---|
| 5,383,217 A | 1/1995 | Uemura | |
| 5,586,134 A * | 12/1996 | Das et al. | 372/38.03 |
| 6,018,537 A * | 1/2000 | Hofmann et al. | 372/25 |
| 6,130,904 A * | 10/2000 | Ishihara et al. | 372/25 |
| 6,176,135 B1 | 1/2001 | Dubois et al. | |
| 6,317,447 B1 | 11/2001 | Partlo et al. | |
| 6,516,013 B1 * | 2/2003 | Patzel et al. | 372/29.02 |
| 6,519,039 B1 | 2/2003 | Morishita et al. | |
| 6,721,344 B1 * | 4/2004 | Nakao et al. | 372/55 |
| 2001/0012309 A1 | 8/2001 | Albrecht et al. | |
| 2001/0036207 A1 | 11/2001 | Nagain et al. | |
| 2001/0046248 A1 | 11/2001 | Sano et al. | |
| 2002/0006148 A1 | 1/2002 | Govorkov et al. | |

FOREIGN PATENT DOCUMENTS

| | | |
|---|---|---|
| CN | 12583252 A | 6/2000 |
| EP | 1158629 A2 * | 11/2001 |
| EP | 1 158 629 A2 | 11/2001 |
| EP | 1 245 984 A2 | 10/2002 |
| WO | WO 99/46580 | 9/1999 |

OTHER PUBLICATIONS

An Office action from the Chinese Patent Office dated Oct. 29, 2004 for Appl. No. 03103270.
English translation of the above Chinese Office action dated Oct. 29, 2004 for Appl. No. 031030270.

* cited by examiner

Primary Examiner—Minsun Oh Harvey
Assistant Examiner—Armando Rodriguez
(74) Attorney, Agent, or Firm—Morgan & Finnegan, L.L.P.

(57) ABSTRACT

There is to provide a laser apparatus that emits a laser beam by exciting gas enclosed in a chamber, including a gas characteristic detecting mechanism for detecting a characteristic of the gas in the chamber, and a calculation mechanism for calculating an oscillation wavelength and/or a wavelength spectral bandwidth of the laser beam based on a detected result by the gas characteristic detecting mechanism.

18 Claims, 7 Drawing Sheets

LASER APPARATUS, EXPOSURE APPARATUS AND METHOD

BACKGROUND OF THE INVENTION

The present invention relates generally to laser apparatuses, and more particularly to a laser apparatus in an exposure apparatus that illuminates a mask or reticle (these terms are used interchangeably in this application) which forms a pattern for use with a lithography process for fabricating semiconductor elements, liquid crystal display devices (LCD), image pick-up devices (such as CCDs, etc.), thin-film magnetic heads, and the like.

Along with recent demands on smaller and lower profile electronic devices, fine semiconductor devices to be mounted onto these electronic devices have been increasingly in demand. As a transfer (lithography) method for fabricating semiconductor devices, a projection exposure apparatus has been used conventionally.

A critical dimension (or resolution) transferable by a projection exposure apparatus is in proportion to the wavelength of light to be used for exposure. Therefore, in recent years, the exposure light source is in transition from the conventional ultra-high pressure mercury lamp (including g-line (with a wavelength of about 436 nm) and i-line (with a wavelength of about 365 nm)) to a KrF excimer laser with a shorter wavelength (i.e., a wavelength of about 248 nm) to the ArF excimer laser (with a wavelength of about 193 nm), and practical use of the $F_2$ laser (with a wavelength of about 157 nm) is also being promoted.

Optical elements that efficiently transmit light in such a wavelength range (i.e., in the ultraviolet region) are limited to certain glass materials such as synthetic quartz, calcium fluoride, etc., and thus it is difficult to correct chromatic aberration. Therefore, in using the KrF excimer laser and the ArF excimer laser for an exposure light source, a wavelength spectral bandwidth of about 300 pm at full width at half maximum in a spontaneous oscillation state is generally turned to a narrowband of, e.g., about 0.5 pm, and feedback control (or wavelength control) is provided by a wavelength selection element in a resonator such that a laser beam may be always oscillated with a desired wavelength while the wavelength is monitored.

On the other hand, in using the $F_2$ laser as an exposure light source, it is impossible to turn a wavelength spectral bandwidth into a narrowband or to provide the wavelength control for technical reasons: including multiple oscillation spectra existing in the neighborhood of 157 nm; its wavelength spectral bandwidth in a spontaneous oscillation state as much as about 1 pm, i.e., narrower than the KrF excimer laser and the ArF excimer laser; difficult turning of the laser beam into a narrower band since the performance of an optical element used for a wavelength bandwidth of 157 nm has not been satisfactory enough to be put into practical use, difficult measurement of a wavelength and a wavelength spectral bandwidth with high precision inside a laser apparatus, and so on. Accordingly, the line selection method has been proposed which selects, from among several wavelengths oscillated in the $F_2$ laser, only one wavelength for oscillation.

The $F_2$ and other excimer laser generally require a laser apparatus that encloses halogen gases such as fluorine, etc., and rare gases such as helium, neon, etc. in a chamber, and uses electric discharges produced by applying high voltage between the electrodes disposed in the chamber to excite gases, thus oscillating the laser beam. The continuous oscillation of the laser beam would lower the concentration of the halogen gas because the halogen gas would react on impurities present in the chamber, or be absorbed by the inner wall of the chamber. Therefore, a compositional ratio of the laser gas varies from its optimum ratio, thereby causing pulse energy (or laser oscillation efficiency) to be lowered.

Accordingly, the pulse energy of the laser beam is kept at a desired value by raising the voltage to be applied between the electrodes, or by insufflating a specified amount of gas including halogen gas (gas injection) to raise the gas pressure in the chamber when a rising amount of the applied voltage reaches a certain threshold. However, the repetitive gas injection would increase impurities in the chamber, and facilitate interaction between the impurities and halogen. As a result, the pulse energy cannot be maintained at a desired value even with the increased voltage to be applied between the electrodes rises and gas injection, because. When the gas injection becomes less effective, the majority of the gas in the chamber is exhausted and fresh gas is injected (gas exchange). In other words, the $F_2$ and other excimer laser obtain a desired output by changing the gas pressure and/or the partial pressure of fluorine in the chamber or by raising the voltage applied between the electrodes, depending on the use circumstances.

In case of the $F_2$ laser, it has become evident that as gas characteristics such as its pressure and temperature in a chamber vary because of gas injection, etc., the oscillation wavelength and wavelength spectral bandwidth of the laser beam will change accordingly.

Accordingly, when the $F_2$ laser is used as an exposure light source, its oscillation wavelength and wavelength spectral bandwidth will change during exposure. If they exceed, e.g., wavelength stability and a tolerance of the wavelength spectral bandwidth required by an exposure system, it becomes difficult to achieve desired resolution required for the exposure apparatus.

Moreover, when the $F_2$ laser is used, it is difficult to directly confirm whether or not the laser beam exhibits its desired performance during exposure, because the measurement of a wavelength is technically very difficult in a laser apparatus with high accuracy. The direct confirmation of the oscillation wavelength, if any, would clearly give an adverse impact onto the productivity of the exposure apparatus in running cost and maintenance frequency in light of the current durability of a current optical element. A similar problem arises when a laser that oscillates in a wavelength shorter than the $F_2$ laser is used as a light source.

BRIEF SUMMARY OF THE INVENTION

Accordingly, it is an exemplified object of the present invention to provide a laser apparatus, and an exposure apparatus and method, which indirectly detect a change in an oscillation wavelength and wavelength spectral bandwidth of a laser beam, and maintain predetermined optical performance.

A laser apparatus as one aspect of the present invention, which emits a laser beam by exciting gas enclosed in a chamber includes a gas characteristic detecting mechanism for detecting a characteristic of the gas in the chamber, and a calculation mechanism for calculating an oscillation wavelength and a wavelength spectral bandwidth of the laser beam based on a detected result by the gas characteristic detecting mechanism.

The gas characteristic detecting mechanism may be a pressure sensor for detecting a pressure of the gas in the chamber, or a temperature sensor for detecting a temperature of the gas in the chamber. The laser apparatus may further include a controller for determining whether an oscillation wavelength and/or a wavelength spectral bandwidth of the laser beam fall within a permissible range, and for generating correction information that enables the oscillation wavelength and/or the wavelength spectral bandwidth of the laser beam to fall within the permissible range. The laser beam may oscillate at a wavelength of about 157 nm or shorter.

An exposure apparatus of another aspect of the present invention, which uses a laser beam to exposure a pattern on a mask, onto an object includes a laser apparatus for exciting gas to emit the laser beam, the laser apparatus including a gas characteristic detecting mechanism for detecting a characteristic of the gas enclosed in a chamber, and a correction mechanism for correcting the exposure based on a detected result by the gas characteristic detecting mechanism.

The exposure apparatus may further include a calculation mechanism for calculating an oscillation wavelength and a wavelength spectral bandwidth of the laser beam based on a detected result by the gas characteristic mechanism. The calculation mechanism may be provided inside or outside the laser apparatus.

An exposure method of still another aspect of the present invention, which uses a laser beam generated by exciting gas enclosed in a chamber to expose a pattern on a mask, onto an object includes the steps of detecting a characteristic of the gas in the chamber, and determining whether the exposure is to continue or stop based on a detected result by the detecting step.

The detecting step may include the step of calculating an oscillation wavelength and/or a wavelength spectral bandwidth of the laser beam from the characteristic. The determining step may include the step of comparing the detected result by the detecting step, with a permissible range.

The exposure method may further include the step of changing the characteristic of the gas in the chamber when the determining step determines that the exposure is to stop. The gas characteristic changing step may change a pressure and/or temperature of the gas in the chamber.

An exposure method of another aspect of the present invention, which uses a laser beam generated by exciting gas enclosed in a chamber to expose a pattern on a mask, onto an object includes the steps of detecting a characteristic of the gas in the chamber, calculating an oscillation wavelength and/or a wavelength spectral bandwidth of the laser beam from the characteristic detected by the detecting step, and correcting the exposure based on the calculated oscillation wavelength.

The correcting step may correct an optical characteristic of a projection optical system which projects the pattern on the mask onto the object. The correcting step may move the object along an optical axis.

A database for calculating, from a characteristic of a gas enclosed in a chamber, an oscillation wavelength or wavelength spectral bandwidth of a laser beam generated by exciting the gas may constitute another aspect of the present invention. In these databases, the characteristic may include a pressure and/or temperature of the gas.

A device fabrication method of another aspect of the present invention include the steps of exposing a pattern on a mask, onto an object by using the above exposure apparatus, and performing a predetermined process for the exposed object. Claims for the device fabrication method that exhibits operations similar to those of the above exposure apparatus cover devices as their intermediate products and finished products. Moreover, such devices include semiconductor chips such as LSIs and VLSIs, CCDs, LCDs, magnetic sensors, thin-film magnetic heads, etc.

Other objects and further features of the present invention will become readily apparent from the following description of the embodiments with reference to accompanying drawings.

DETAILED DESCRIPTION OF THE PREFERRED EMBODIMENTS

Figure 1:
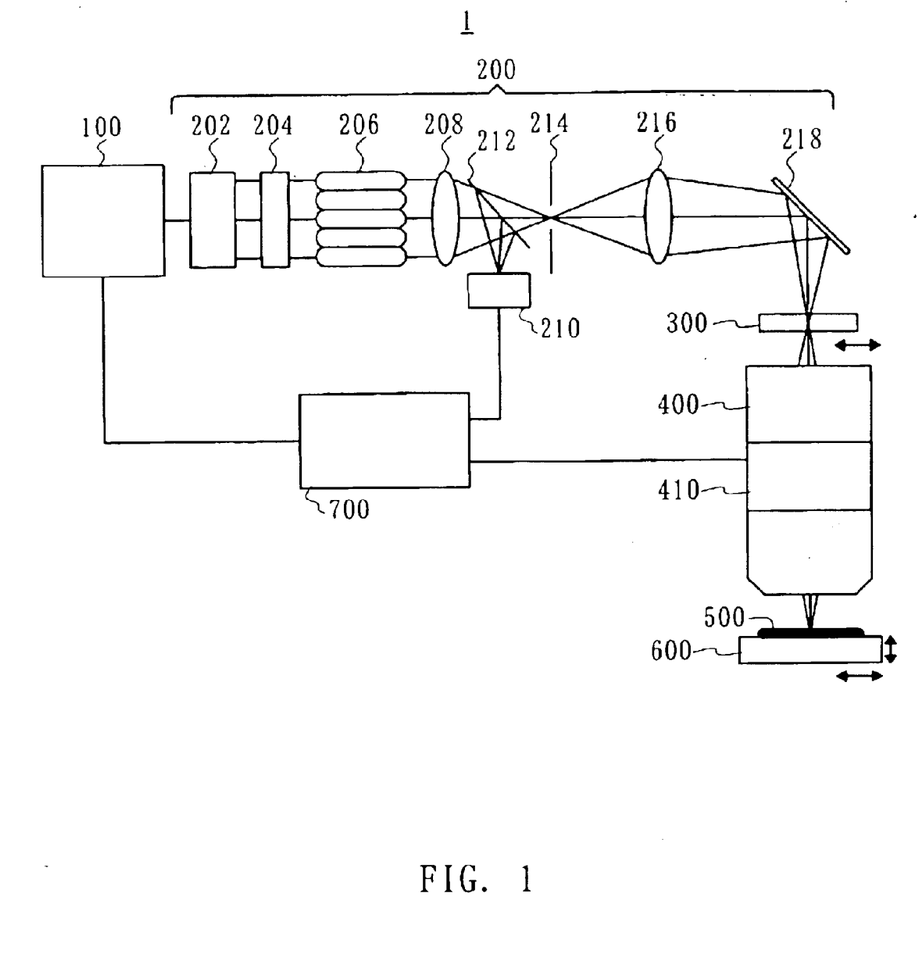
FIG. 1 is a schematic block diagram of an exposure apparatus as one aspect of the present invention.

Referring now to accompanying drawings, a description will be given of an exposure apparatus 1 and a laser apparatus 100 as aspects of the present invention. However, the present invention is not limited to these embodiments, and each element may be replaced within a scope of this invention. Here, FIG. 1 is a schematic block diagram of the exposure apparatus 1 as one aspect of the present invention. As shown in FIG. 1, the inventive exposure apparatus 1 includes the laser apparatus 100, an illumination optical system 200, a mask 300, a projection optical system 400, a plate 500, a stage 600, and a controller 700.

The exposure apparatus 1 is a projection exposure apparatus that exposes onto the plate 500 a circuit pattern created on the mask 300, e.g., in a step-and-repeat or a step-and-scan manner. Such an exposure apparatus is suitable for a submicron or quarter-micron lithography process, and this embodiment exemplarily describes a step-and-scan exposure apparatus (which is also called "a scanner"). "The step-and-scan manner", as used herein, is an exposure method that exposes a mask pattern onto a wafer by continuously scanning the wafer relative to the mask, and by moving, after a shot of exposure, the wafer stepwise to the next exposure area to be shot. "The step-and-repeat manner" is another mode of exposure method that moves a wafer stepwise to an exposure area for the next shot every shot of cell projection onto the wafer.

Figure 2:
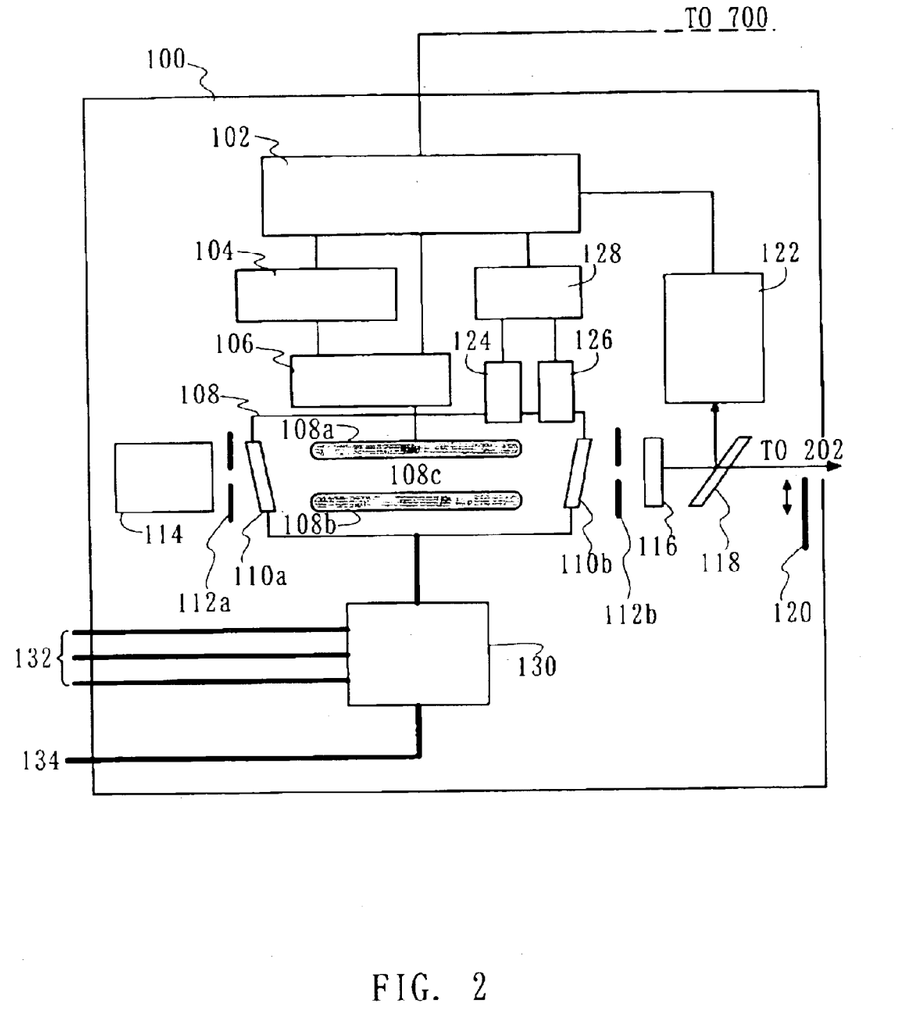
FIG. 2 is a schematic block diagram of a laser apparatus as one aspect of the present invention.

The laser apparatus 100 includes, as shown in FIG. 2, a controller 102, a high-voltage light source 104, a compression circuit 106, a chamber 108, apertures 112a and 112b, a line selection module 114, a partially transparent mirror 116, a beam splitter 118, a shutter 120, a light monitor section 122, a pressure sensor 124, a temperature sensor 126, a calculator 128, and a gas controller 130, thus emitting, e.g., the $F_2$ laser (with a wavelength of about 157 nm) that emits pulsed light or a laser beam that oscillates at a shorter wavelength. Here, FIG. 2 is a schematic block diagram of the laser apparatus 100 as another aspect of the present invention.

The controller 102 receives a trigger signal, energy command, or an applied voltage command all sent from the controller 700 in the exposure apparatus 1. Based on such signals, the controller 102 sends a high voltage signal to the high voltage light source 104, as well as sending the trigger signal to the compression circuit 106 at a timing of emitting a laser beam.

There are provided discharge electrodes 108a and 108b in the chamber 108, in which as a laser gas, halogen gases such as fluorine, etc., and rare gases such as helium, neon, etc. are injected at a specified rate.

If a high voltage of as much as 10~30 kV is applied between the discharge electrodes 108a and 108b (to the area 108c) by the compression circuit 106, electric discharge takes place in this area 108c, and excites laser gas injected in the chamber 108, thus emitting light between the discharge electrodes 108a and 108b (area 108c).

Light generated between the discharge electrodes 108a and 108b (the area 108c) is amplified while passing through windows 110a and 110b and the apertures 112a and 112b, and going back and forth between a rear mirror (not shown) inside the line selection module 114 and the partial transparent mirror 116, thus growing to be a laser beam.

The line selection module 114 houses a wavelength selection element such as a prism, which selects light only with a specific wavelength from among multiple wavelengths oscillated in the $F_2$ laser, and reflects it to the chamber 108. Thus, a laser beam is emitted with such a wavelength. Any reflected light of another wavelength is intercepted by the apertures 112a and 112b, and not output as a laser beam.

Most generated laser beam transmit the beam splitter 118, and outgoes to the shaping optical system 202 of the illumination optical system 202 when the shutter 120 opens. Some of the laser beams reflected at the beam splitter 118 are introduced into the light monitor section 122.

The light monitor section 122 monitors light energy per pulse, and sends these results to the controller 102. The controller 102 determines the voltage applied for pulsed light to be generated next time based on the energy measurement result from the light monitor section 122 or energy control information sent from the controller 700 of the exposure apparatus 1.

The chamber 108 is provided with the pressure sensor 124 that measures the pressure of the gas in the chamber 108 and the temperature sensor 126 that measures the temperature of the gas in the chamber 108, so as to measure the gas pressure and temperature in the chamber 108 constantly or at a specified timing. Measurement results of the pressure and temperature of the gas in the chamber 108 are sent to the calculator 128 that calculates the oscillation wavelength and wavelength spectral bandwidth of a laser beam. The calculator 128 calculates the oscillation wavelength and wavelength spectral bandwidth of the laser beam based on the measured results from the pressure sensor 124 and the temperature sensor 126, and sends the result to the controller 102.

The result of the oscillation wavelength and wavelength spectral bandwidth of the laser beam is also sent, as needed, from the controller 102 to the controller 700 in the exposure apparatus 1. As described later, in order to calculate the oscillation wavelength and wavelength spectral bandwidth of the laser beam, the calculator 128 is required to store a relational expression from the correlation between gas characteristics such as the pressure and temperature of the gas and the oscillation wavelength and wavelength spectral bandwidth, which relationship has been obtainable through an experiment.

This embodiment provides the laser apparatus 100 with the calculator 128 for calculating the oscillation wavelength and wavelength spectral bandwidth of a laser beam based on the measurement results of the pressure sensor 124 and the temperature sensor 126, but the controller 700 of the exposure apparatus 1 may have a unit for calculating both or at least either one of the oscillation wavelength and wavelength spectral bandwidth of a laser beam based on gas characteristics. In that case, the results of the gas characteristics measured by the pressure sensor 124 and the temperature sensor 126 are sent directly to the controller 102, and are converted into the oscillation wavelength and wavelength spectral bandwidth at the controller 700 in the exposure apparatus 1 from the controller 102.

When a laser beam continues to oscillate, the laser gas gradually deteriorates in the chamber 108 such that the ratio of its halogen gas drops and impurities increase. Therefore, it is necessary to inject gas including halogen gas periodically into the chamber 108 (hereinafter "gas injection"), or to exchange the major part of the laser gas in the chamber 108 ("gas exchange" hereinafter).

When gas injection or gas exchange is necessary, the gas controller 130 introduces fresh gas into the chamber 108 via a laser gas pipe 132, or exhausts a part or major part of the deteriorated gas from the chamber 108 via an exhausting gas pipe 134.

Figure 3:
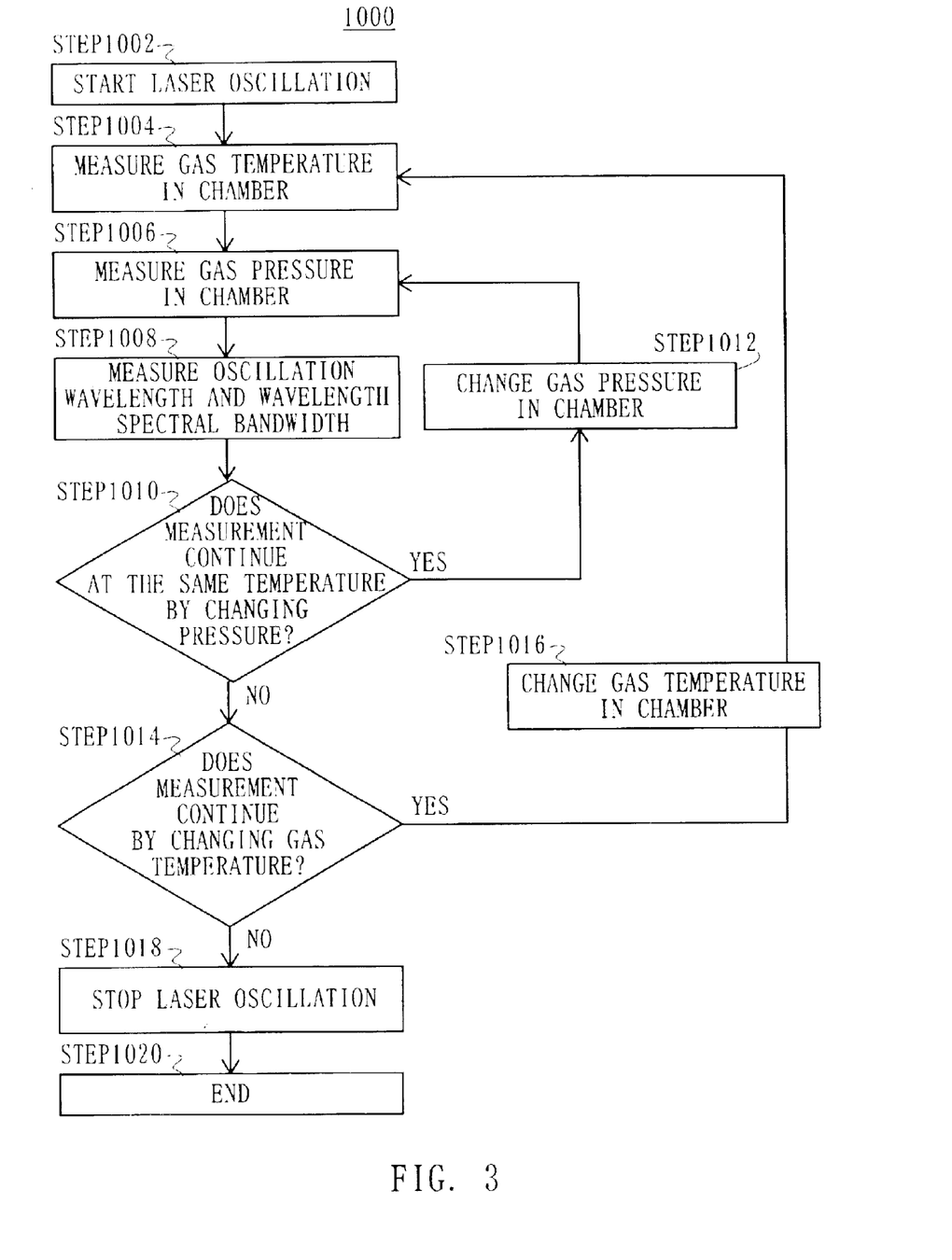
FIG. 3 is a flowchart for explaining how to obtain an oscillation wavelength and wavelength spectral bandwidth of a laser beam in an experimental way when changing the gas pressure and gas temperature in the chamber in the laser apparatus shown in FIG. 2.

Referring now to FIG. 3, a description will be given of an example of how to experimentally derive a relationship between gas characteristics in the chamber 108 and the oscillation wavelength and wavelength spectral bandwidth of the laser beam. FIG. 3 is a flowchart for explaining a method 1000 that experimentally obtains an oscillation wavelength and wavelength spectral bandwidth of a laser beam when the gas pressure and gas temperature are changed in the chamber 108. A spectrometer is used to measure the oscillation wavelength and wavelength spectral bandwidth of the laser beam oscillated from the laser apparatus 100.

First, the laser apparatus 100 start oscillation (Step 1002) to introduce a laser beam into the spectrometer. Then, the gas temperature (Step 1004) and gas pressure (Step 1005) are measured in the chamber 108, and the spectrometer measures the oscillation wavelength and wavelength spectral bandwidth of the laser beam at approximately the same time or at an immediately later timing (Step 1008).

Next, while the gas temperature is maintained constant, the gas pressure in the chamber 108 is changed and it is determined whether the oscillation wavelength and wavelength spectral bandwidth of the laser beam is to continue or stop (Step 1010). When the measurement is to continue, the gas pressure in the chamber 108 is changed (Step 1012), the gas pressure is measured again (1016), and then the oscillation wavelength and wavelength spectral bandwidth of the laser are measured again (Step 1008).

When data gathering of the gas pressure range to be used by the laser apparatus 100 is completed, the measurement at the same gas temperature stops and it is determined whether the oscillation wavelength and wavelength spectral bandwidth of the laser beam is to continue or stop by changing the gas temperature in the chamber 108 (Step 1014). When the measurement is to continue, the gas temperature in the chamber 108 is changed (Step 1016). The gas temperature may be changed by changing the oscillation frequency of the laser beam, or by controlling the temperature through a temperature control device in the chamber 108 such as a heater.

After the gas temperature changes, the gas pressure is changed again while the gas temperature is maintained constant, and the oscillation wavelength and wavelength spectral bandwidth of the laser beam are measured (repeat the procedure after Step 1004). When data gathering of the gas pressure range to be used by the laser apparatus 100 is completed, the laser oscillation stops (Step 1018), and the operation ends (Step 1020).

Figure 4:
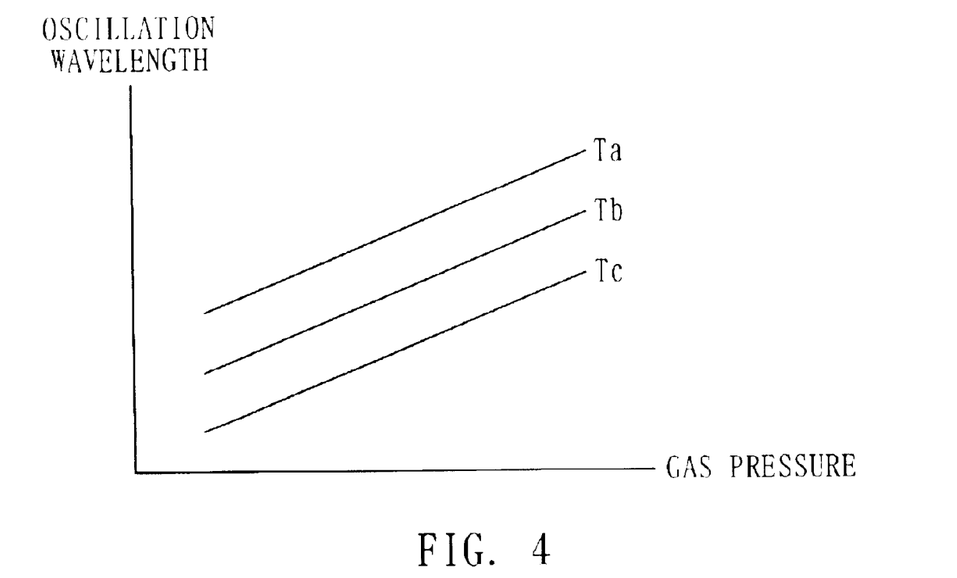
FIG. 4 is a graph showing a relationship between the gas characteristic of the laser apparatus shown in FIG. 2 and an oscillation wavelength of the laser beam.
Figure 5:
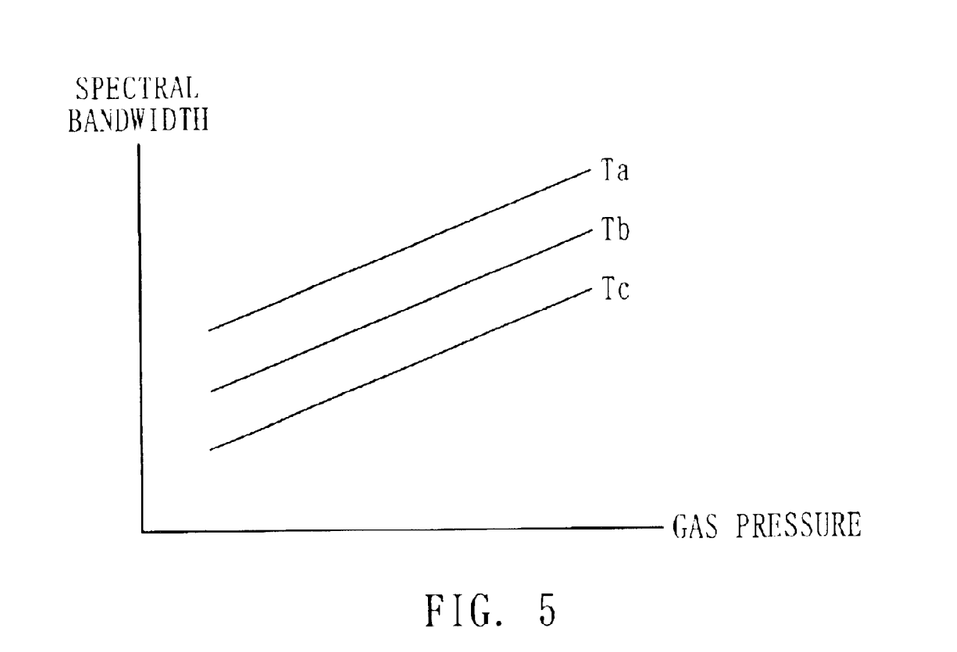
FIG. 5 is a graph showing the relationship between the gas characteristic of the laser apparatus shown in FIG. 2 and a wavelength spectral bandwidth of the laser beam.

FIGS. 4 and 5 show exemplary data obtained by this method 1000. FIG. 4 is a graph of a relationship between the gas characteristics of the laser apparatus 100 (the gas pressure and temperature) and the oscillation wavelength of the laser beam, where the abscissa axis is the gas pressure and the ordinate axis is the oscillation wavelength, thus showing data by changing the gas temperature like $T_a$, $T_b$, $T_c$ . . . . FIG. 5 is a graph of a relationship between the gas characteristics of the laser apparatus 100 (the gas pressure and gas temperature) and the wavelength spectral bandwidth of the laser beam, where the abscissa axis is the gas pressure and the ordinate axis is the wavelength spectral bandwidth, showing data by changing the gas temperature like $T_a$, $T_b$, $T_c$ . . . . Such data serve as a database for calculating the oscillation wavelength or the wavelength spectral bandwidth of the laser beam based on the measured gas characteristics.

Referring to FIGS. 4 and 5, the oscillation wavelength λ and the wavelength spectral bandwidth Δλ of the laser apparatus 100 may be estimated by the equation (function) shown below where p is the pressure of the laser gas, and T is the temperature of the laser gas:

$\lambda = f(p, T)$            (1) (Oscillation wavelength)

$\Delta\lambda = g(p, T)$           (2) (Wavelength spectral bandwidth)

In practice, the function may be estimated from results obtainable by implementing this method 1000 at a laser manufacturer's plant or an exposure apparatus manufacturer's plant.

The instant embodiment has typified the gas pressure and gas temperature in the chamber 108 as items to be detected about gas characteristics in finding the oscillation wavelength and wavelength spectral bandwidth of the laser beam that the laser apparatus 100 emits, but other gas characteristics may be used such as gas composition ratio, etc. Of course, the oscillation wavelength and wavelength spectral bandwidth may be derived from detections of these characteristics together with the gas pressure and gas temperature.

The calculator 128 stores the functions f (p, T) and g (p, T) in the equations (1) and (2). The calculator 128 calculates the oscillation wavelength of the laser beam each time using the function f (p, T) and measured values of the gas pressure and gas temperature in the chamber 108 obtained by the pressure sensor 124 and the temperature sensor 126. The calculator 128 sends this calculation result to the controller 102, and the controller 102 sends, if needed, it to the controller 700 in the exposure apparatus 1.

The calculator 128 calculates the wavelength spectral bandwidth of the laser beam each time using the function g (p, T) and measured values of the gas pressure and gas temperature in the chamber 108 obtained by the pressure sensor 124 and the temperature sensor 126. The calculator 128 sends this calculation result to the controller 102, and the controller 102 sends, if needed, it to the controller 700 in the exposure apparatus as required.

The controller 102 determines whether the oscillation wavelength and wavelength spectral bandwidth the laser beam calculated each time fall within permissible ranges. When the controller 102 determines that the oscillation wavelength and wavelength spectral bandwidth fall within the permissible ranges, the exposure operation continues. On the other hand, when the controller 102 determines that at least one of the oscillation wavelength and the wavelength spectral bandwidth is out of permissible range, it sends to the controller 700 in the exposure apparatus 1 a signal informing that at least one of the oscillation wavelength and the wavelength spectral bandwidth is out of the permissible range. In response, the controller 700 stops the exposure operation as well as taking steps so that the oscillation wavelength and wavelength spectral bandwidth may fall within the permissible range.

Turning back to FIG. 1, the illumination apparatus 200 is an optical system for illuminating the mask 300, and includes, in order along the optical path of the laser beam from the laser apparatus 100, a beam shaping optical system 202 for shaping a section of the laser beam into a desired shape, a variable ND filter 204 for adjusting the intensity of the laser beam, an optical integrator 206 for dividing and superimposing the laser beam to make its intensity uniform on the surface of the mask 300, a condenser lens 208 for condensing the laser beam via the optical integrator 206, a beam splitter 212 for leading part of the laser beam from the condenser lens 208 to a light detector 210, a masking blade 214, arranged near a point where the laser beam is condensed by the condenser lens 208, for regulating the range to irradiate the laser beam onto the mask 300 plane, an imaging lens 216 for forming an image of the masking blade 214 onto the mask 300, and a mirror 218 for directing the optical path of the laser beam in the direction of the projection optical system 400.

The mask 300 forms a circuit pattern (or an image) to be transferred, and is supported and driven by a mask stage (not shown). Diffracted light emitted from the mask 300 passes the projection optical system 400, thus and then is projected onto the plate 500. The mask 300 and the plate 500 are located in an optically conjugate relationship. Since the exposure apparatus 1 of this embodiment is a scanner, the mask 300 and the plate 500 are scanned at the speed ratio of the demagnification ratio of the projection optical system 400, thus transferring the pattern on the mask 300 to the plate 500.

The projection optical system 400 demagnifies a circuit pattern on the mask 300 at a specified magnification ratio (e.g., ½~1/10), thus projecting and exposing (transferring) the pattern to one of multiple shot areas on the plate 500. The projection optical system 400 may use an optical system solely including a plurality of lens elements, an optical system including a plurality of lens elements and at least one concave mirror (a catadioptric optical system), an optical system including a plurality of lens elements and at least one diffractive optical element such as a kinoform, and a full mirror type optical system, and so on. Any necessary correction of the chromatic aberration may use a plurality of lens units made from glass materials having different dispersion values (Abbe values), or arrange a diffractive optical element such that it disperses in a direction opposite to that of the lens unit.

The projection optical system 400 is provided with an aberration correction unit 410. The projection optical system 400's aberration produced by a fluctuation of the oscillation wavelength of the laser beam may be corrected by driving some lenses in the aberration correction unit 410 or by controlling a pressure between specified lenses.

The plate 500 is an object to be exposed such as a wafer and a liquid crystal plate, and photoresist is applied onto it. A photoresist application step includes a pretreatment, an adhesion accelerator application treatment, a photoresist application treatment, and a pre-bake treatment. The pretreatment includes cleaning, drying, etc. The adhesion accelerator application treatment is a surface reforming process so as to enhance the adhesion between the photo-resist and a base (i.e., a process to increase the hydrophobicity by applying a surface active agent), through a coat or vaporous process using an organic film such as HMDS (Hexamethyldisilazane). The pre-bake treatment is a baking (or burning) step, softer than that after development, which removes the solvent.

The stage 600 uses, for example, a linear motor to move the plate 500 in a direction vertical to the optical axis of the projection optical system 400. The mask 300 and plate 500 are, for example, scanned synchronously, and the positions of the stage 600 and a mask stage (not shown) are monitored, for example, by a laser interferometer and the like, so that both are driven at a constant speed ratio. The stage 600 can also move the plate 500 in a direction parallel to the optical axis of the projection optical system 400, so that the plate is controlled such that the image-forming position of the mask 300 and the surface of the plate 500 agree.

The stage 600 is installed on a stage surface plate supported on the floor and the like, for example, via a damper, and the mask stage and the projection optical system 400 are installed on a body tube surface plate (not shown) supported, for example, via a damper to the base-frame placed on the floor.

The controller 700 receives the oscillation wavelength and wavelength spectral bandwidth of a laser beam sent from the laser apparatus 100 (i.e., the oscillation wavelength and wavelength spectral bandwidth of a laser beam calculated from the measured gas characteristics), and based on this, drives an optical member (not shown) in the aberration correction unit 410 of the projection optical system 400 as required, controls the pressure between specific lenses, corrects an interval between specified lenses, and drives the stage 600, thus making an adjustment such that the performance of image-forming a pattern on the mask 300 onto the plate 500 is on a desired level. In other words, the controller 700 corrects aberration produced by a change of the oscillation wavelength of a laser beam.

As described above, the laser apparatus 100 determines whether the oscillation wavelength and wavelength spectral bandwidth of the laser beam calculated from the measured gas characteristics fall within the permissible ranges. When at least one of the oscillation wavelength and wavelength spectral bandwidth of the laser beam is out of permissible range, the controller 700 receives the signal indicating that at least one of the oscillation wavelength and wavelength spectral bandwidth of the laser beam is out of permissible range. Receiving such a signal, the controller 700 stops exposing a pattern to the plate 500, closes the shutter 120 located at the laser beam exit opening of the laser apparatus 100, and makes an adjustment so that the oscillation wavelength and wavelength spectral bandwidth of the laser beam in the laser apparatus 100 may fall within the permissible range. When the adjustment finishes, the controller 700 opens the shutter 120, and resumes the exposure onto the plate 500.

The controller 700 sends a trigger signal for the laser apparatus 100 to emit a laser beam as well as processing photo-electric conversion signals in accordance to the intensity of the laser beam photo-electrically converted by the photo-detector 210. By integrating such photo-electric conversion signals, the controller 700 sends to the laser apparatus 100 a signal of an energy command or an applied voltage command for controlling an amount of exposure. Based on such a signal, the laser apparatus 100 allows the controller 102 to control each unit and emit light with predetermined energy as described above.

The controller 700 receives information from the laser apparatus 100, which includes, in addition to the signal indicative of a determination of whether the oscillation wavelength and wavelength spectral bandwidth of a laser beam are within the permissible ranges, a signal indicative of a determination of whether energy stability is normal or abnormal, an interlock signal, etc. Based on these signals, the controller 700 determines whether the exposure operation is to continue or stop, and controls the oscillation state of the laser apparatus 100.

Figure 6:
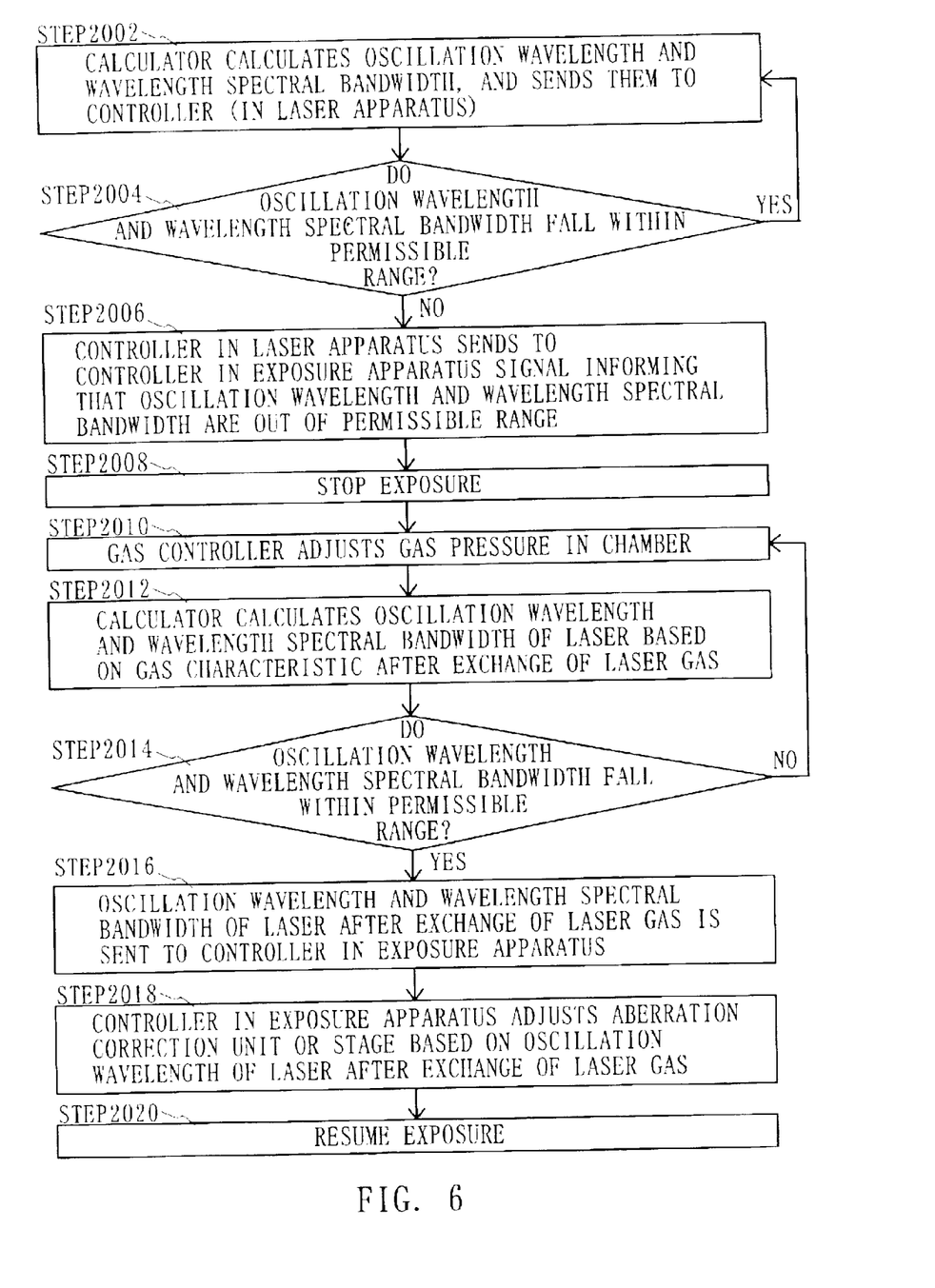
FIG. 6 is a flowchart for explaining a process when an oscillation wavelength or wavelength spectral bandwidth of a laser beam oscillated from the laser apparatus shown in FIG. 2 becomes out of permissible range.

Referring now to FIG. 6, a description will be given of a treatment when the oscillation wavelength or wavelength spectral bandwidth of a laser beam is out of permissible range. FIG. 6 is a flowchart for explaining a process when the oscillation wavelength or wavelength spectral bandwidth of a laser beam that the laser apparatus 100 oscillates are out of permissible range. While the laser beam oscillates, the oscillation wavelength and wavelength spectral bandwidth of the laser beam are calculated from measurement results sent to the calculator 128 constantly or at a specific timing, of the pressure sensor 124 and the temperature sensor 126, and such a calculation result is sent to the controller 102 (Step 2002). The controller 102 determines whether the oscillation wavelength and wavelength spectral bandwidth fall within the permissible ranges (Step 2004).

If the oscillation wavelength and wavelength spectral bandwidth of a laser beam are within the permissible ranges, the exposure operation continues uninterruptedly. If either one of the oscillation wavelength and wavelength spectral bandwidth is out of permissible range, the controller 102 sends to the controller 700 in the exposure apparatus 1 the signal indicating that at least one of the oscillation wavelength and the wavelength spectral bandwidth is out of permissible range (Step 2006). The controller 700 that received the signal stop sending the laser apparatus 100 the trigger signal for emitting light, and stops the exposure operation (Step 2008).

Thereafter, the gas controller 130 changes the gas pressure in the chamber 108 by exhausting the laser gas insufflated into the chamber 108 in the laser apparatus 100, or filling the chamber 108 with fresh laser gas, thus making an adjustment so that it may have the desired gas pressure (Step 2010). The calculator 128 in the laser apparatus 100 calculates the oscillation wavelength and wavelength spectral bandwidth of the laser from the gas characteristics (gas pressure and gas temperature) after the adjustment (Step 2012), and determines whether such calculation results are well within the permissible range (Step 2014).

If at least one of the oscillation wavelength and the wavelength spectral bandwidth is out of permissible range, the steps from Step 2010 repeat, and the gas controller 130 changes the gas pressure in the chamber 108 in the laser apparatus 100, thus making an adjustment again so that it may have the desired gas pressure. When both the oscillation wavelength and wavelength spectral bandwidth of the laser beam are within the permissible range, the controller 102 sends the calculated oscillation wavelength and wavelength spectral bandwidth of the laser beam to the controller 700 in the exposure apparatus 1 (Step 2016). Based on the oscillation wavelength of the laser beam received from the controller 102, the controller 700 adjusts the aberration correction unit 410 of the projection optical system 400 or the stage 600 (Step 2018), after which exposure to the plate 500 is restarted (2020).

Whenever the laser gas used in the laser apparatus 100 deteriorates to change its characteristic in the chamber 108, e.g., after the gas injection or gas exchange, the calculator 128 calculates the oscillation wavelength and wavelength spectral bandwidth of the laser beam are calculated based on the measurement results of the pressure sensor 124 and the temperature sensor 126, and such a calculation result is sent to the controller 102 and controller 700 of the exposure apparatus 1. At this time, the controller 700 also adjusts the aberration correction unit 410 in the projection optical system 400 or the stage 600 (i.e., moves the plate 500 along the optical axis of the projection optical system 400) based on the calculated oscillation wavelength and wavelength spectral bandwidth of the laser beam. At this time, in order to correct aberration produced by a change in the oscillation wavelength of the laser beam, an optical member (not shown) in the aberration correction unit 410 is driven, the pressure between specified lenses is controlled, a specific lens interval is corrected, or the stage 600 is driven along the optical axis of the projection optical system 400. These operations may be performed regularly, or when at least one of the oscillation wavelength and wavelength spectral bandwidth of the laser beam exceed a preset permissible variable amount.

During exposure, a beam emitted from the laser apparatus 100, e.g., Koehler-illuminates the mask 300 via the illumination optical system 200. Light that passes through the mask 300 and reflects the mask pattern is imaged onto the plate 500 by the projection optical system 400. As described above, the laser apparatus 100, which the exposure apparatus 1 uses, can indirectly detect a change of the oscillation wavelength and wavelength spectral bandwidth of the laser beam, and can exhibit a desired resolution (i.e., stably emits a laser beam of a desired oscillation wavelength and wavelength spectral bandwidth), thus being able to provide devices (such as semiconductor devices, LCD devices, photographing devices (such as CCDs, etc.), thin film magnetic heads, and the like) with high throughput and economical efficiency.

Similar operations and effects would be obtained if the relational expressions are replaced by a look-up table for storing pre-discovered or pre-calculated oscillation wavelength values and wavelength spectral bandwidth values for each possible detected temperature or pressure (or other gas characteristics), and the calculating mechanism is replaced by a data obtaining mechanism for obtaining the data by interrogating the look-up table.

Figure 7:
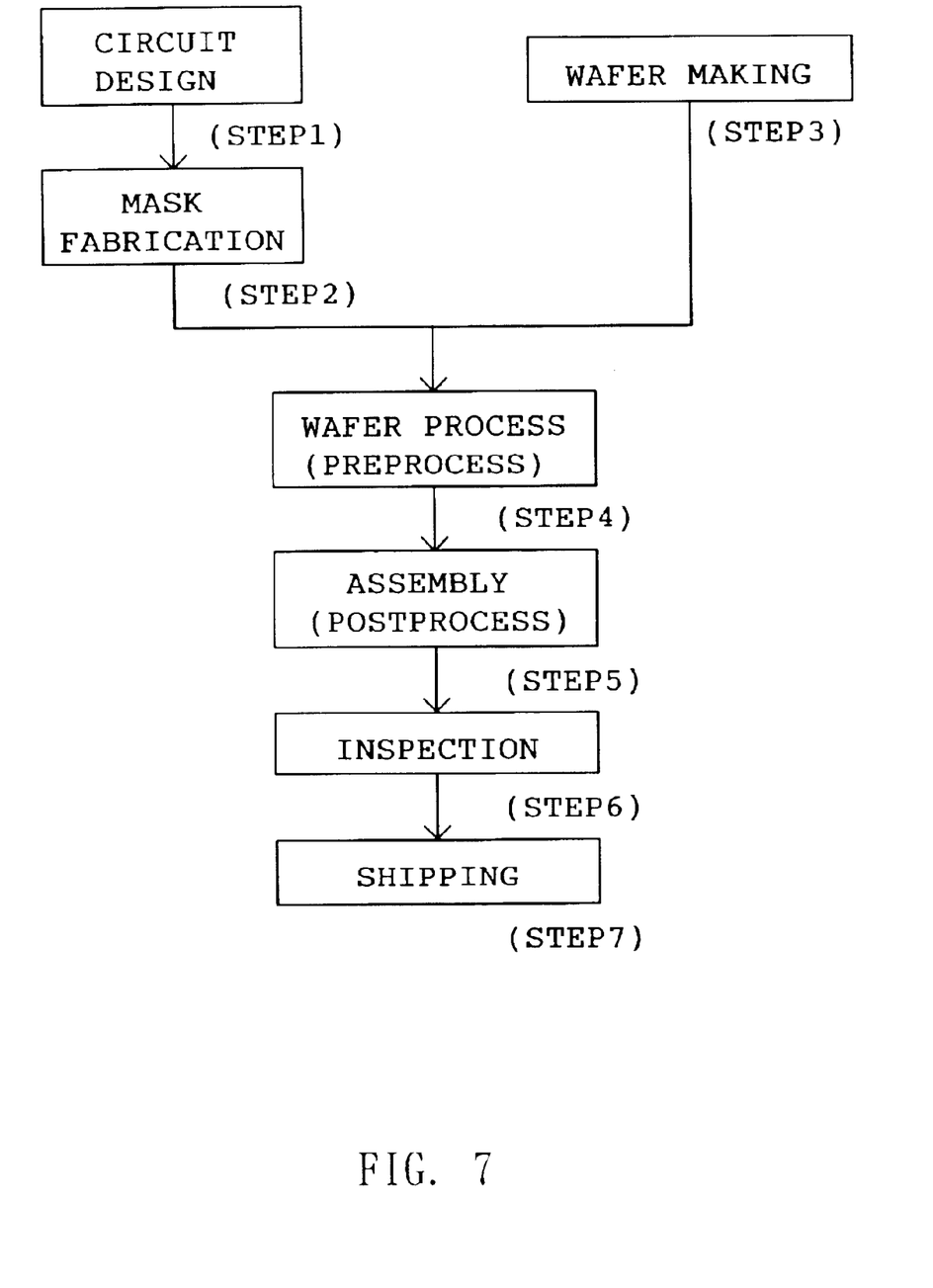
FIG. 7 is a flowchart for explaining a device fabrication method using an inventive exposure apparatus.
Figure 8:
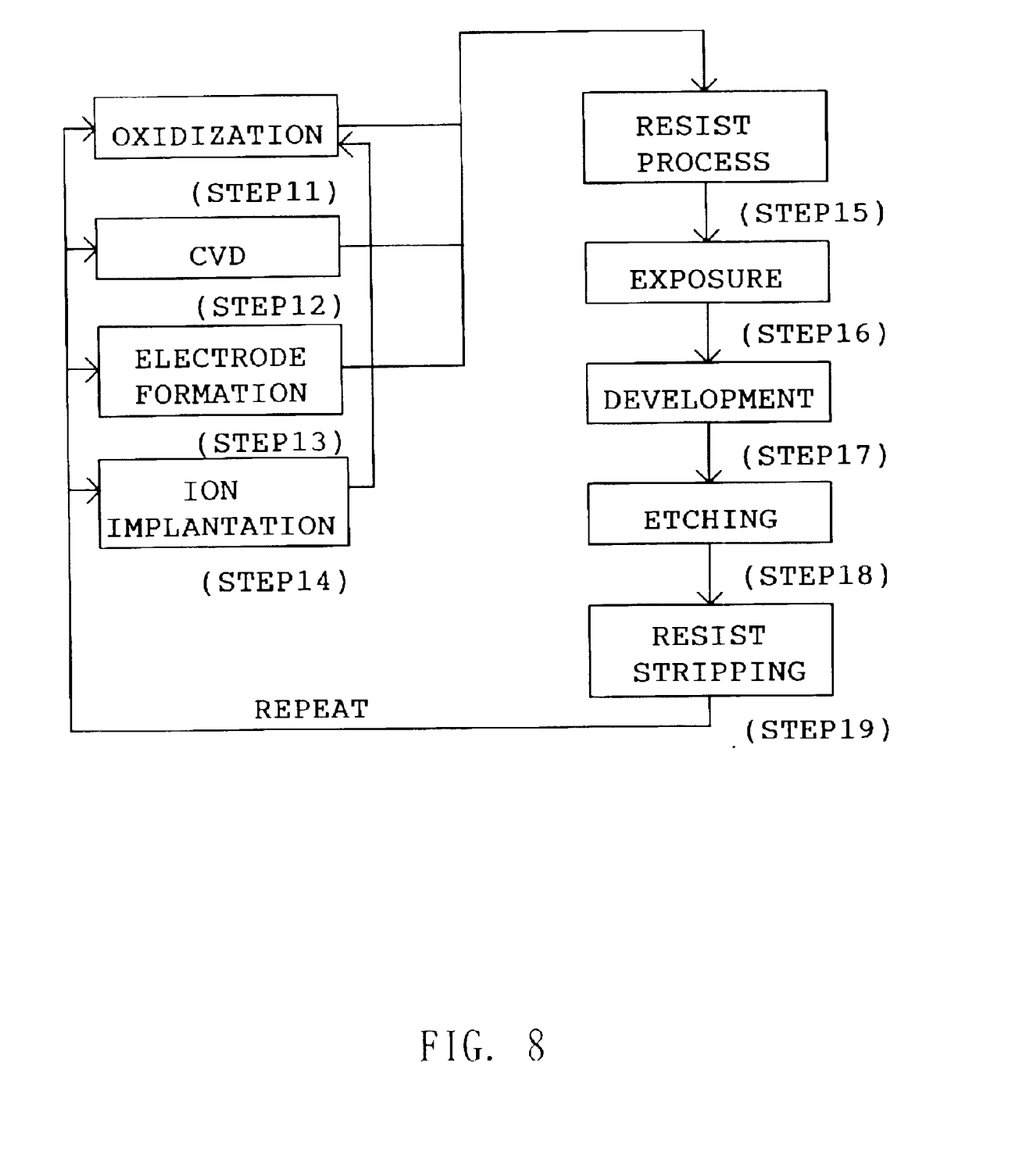
FIG. 8 is a detailed flowchart for Step 4 shown in FIG. 7.

Referring now to FIGS. 7 and 8, a description will be given of an embodiment of a device fabrication method using the above mentioned exposure apparatus 1. FIG. 7 is a flowchart for explaining how to fabricate devices (i.e., semiconductor chips such as IC and LSI, LCDs, CCDs, and the like). Here, a description will be given of the fabrication of a semiconductor chip as an example. Step 1 (circuit design) designs a semiconductor device circuit. Step 2 (mask fabrication) forms a mask having a designed circuit pattern. Step 3 (wafer making) manufactures a wafer using materials such as silicon. Step 4 (wafer process), which is also referred to as a pretreatment, forms actual circuitry on the wafer through lithography using the mask and wafer. Step 5 (assembly), which is also referred to as a post-treatment, forms into a semiconductor chip the wafer formed in Step 4 and includes an assembly step (e.g., dicing, bonding), a packaging step (chip sealing), and the like. Step 6 (inspection) performs various tests for the semiconductor device made in Step 5, such as a validity test and a durability test. Through these steps, a semiconductor device is finished and shipped (Step 7).

FIG. 8 is a detailed flowchart of the wafer process in Step 4. Step 11 (oxidation) oxidizes the wafer's surface. Step 12 (CVD) forms an insulating film on the wafer's surface. Step 13 (electrode formation) forms electrodes on the wafer by vapor disposition and the like. Step 14 (ion implantation) implants ion into the wafer. Step 15 (resist process) applies a photosensitive material onto the wafer. Step 16 (exposure) uses the exposure apparatus 300 to expose a circuit pattern on the mask onto the wafer. Step 17 (development) develops the exposed wafer. Step 18 (etching) etches parts other than a developed resist image. Step 19 (resist stripping) removes disused resist after etching. These steps are repeated, and multi-layer circuit patterns are formed on the wafer. Use of the fabrication method in this embodiment helps fabricate higher-quality devices than ever.

So far, a description has been given of the preferred embodiments of the present invention, but the present invention is not limited to these preferred embodiments, and various modifications and changes may be made in the present invention without departing from the spirit and scope thereof.

Use of the laser apparatus makes it possible to indirectly detect the oscillation wavelength and wavelength spectral bandwidth of a laser beam, and make corrections based on these detected results, thus exhibiting an expected resolution performance. Therefore, an exposure apparatus and method having such a laser apparatus can perform exposure operations with high throughput, providing high quality devices.

What is claimed is:

1. A laser apparatus that emits a laser beam comprising:
    a discharge chamber adapted to receive a laser gas from a gas supply unit;
    at least two electrodes disposed in the discharge chamber and connected to a power supply unit for exciting the laser gas by applying a voltage to the at least two electrodes;
    a gas characteristic detecting unit that detects a characteristic of the laser gas in the discharge chamber;
    a calculation unit that calculates an oscillation wavelength and a wavelength spectral bandwidth of the laser beam based on a detected result by the gas characteristic detecting unit; and
    a control unit that monitors whether each of the oscillation wavelength and the wavelength spectral bandwidth of the laser beam is within a predetermined range and initiates an adjusting process when at least one of the oscillation wavelength and the wavelength spectral bandwidth of the laser beam is out of the predetermined range.

2. A laser apparatus according to claim 1, wherein said gas characteristic detecting unit is a pressure sensor for detecting a pressure of the laser gas in the discharge chamber.

3. A laser apparatus according to claim 1, wherein said gas characteristic detecting unit is a temperature sensor for detecting a temperature of the laser gas in the discharge chamber.

4. A laser apparatus according to claim 1, further comprising a controller for determining whether an oscillation wavelength and/or a wavelength spectral bandwidth of the laser beam fall within a permissible range, and for generating correction information that enables the oscillation wavelength and/or the wavelength spectral bandwidth of the laser beam to fall within the permissible range.

5. A laser apparatus according to claim 1, wherein the laser beam oscillates at a wavelength of about 157 nm or shorter.

6. An exposure method comprising the steps of:
generating a laser beam by electrically exciting a laser gas enclosed in a discharge chamber;
illuminating a mask with the laser beam via an illumination optical system;
projecting a predetermined pattern of the mask onto a wafer via a projecting optical system thereby forming the predetermined pattern onto the wafer;
detecting a characteristic of the laser gas in the discharge chamber; and
determining whether the generating of the laser beam is to continue or stop based on a detected result by said detecting step,
wherein said detecting step comprises the step of calculating an oscillation wavelength and/or a wavelength spectral bandwidth of the laser beam from the characteristic.

7. An exposure method according to claim 6, wherein said determining step comprises the step of comparing the detected result by said detecting step, with a permissible range.

8. An exposure method according to claim 6, further comprising the step of changing the characteristic of the gas in the chamber when said determining step determines that the exposure is to stop.

9. An exposure method according to claim 8, wherein said gas characteristic changing step changes a pressure and/or temperature of the gas in the chamber.

10. An exposure method comprising the steps of:
generating a laser beam by electrically exciting a laser gas enclosed in a discharge chamber;
illuminating a mask with the laser beam via an illumination optical system;
projecting a predetermined pattern of the mask onto a wafer via a projecting optical system thereby forming the predetermined pattern onto the wafer;
detecting a characteristic of the laser gas in the discharge chamber;
calculating an oscillation wavelength and a wavelength spectral bandwidth of the laser beam from the characteristic detected by said detecting step; and
correcting the projecting optical system based on at least one of the oscillation wavelength and the wavelength spectral bandwidth of the laser beam calculated in the calculating step.

11. An exposure method according to claim 10, wherein said correcting step moves the wafer along an optical axis.

12. A computer-readable medium comprising code that, when executed, causes a computer to carry out the steps of:
generating a laser beam by electrically exciting a laser gas enclosed in a discharge chamber;
illuminating a mask with the laser beam via an illumination optical system;
projecting a predetermined pattern of the mask onto a wafer via a projecting optical system thereby forming the predetermined pattern onto the wafer;
detecting a characteristic of the laser gas in the discharge chamber;
calculating an oscillation wavelength and a wavelength spectral bandwidth of the laser beam from the characteristic detected by said detecting step; and
correcting the projecting optical system based on at least one of the oscillation wavelength and the wavelength spectral bandwidth of the laser beam calculated in the calculating step.

13. The computer-readable medium according to claim 12, wherein the characteristic includes a pressure and/or temperature of the gas.

14. The laser apparatus according to claim 1, wherein the adjusting process adjusts the pressure of the laser gas in the discharge chamber.

15. A laser apparatus that emits a laser beam comprising:
a discharge chamber adapted to receive a laser gas from a gas supply unit;
at least two electrodes disposed in the discharge chamber and connected to a power supply unit for exciting the laser gas by applying a voltage to the at least two electrodes;
a gas characteristic detecting unit that detects a characteristic of the laser gas in the discharge chamber; and
a determination unit that determines an oscillation wavelength of the laser beam based on a detected result by said gas characteristic detecting unit.

16. A laser apparatus according to claim 15, wherein said calculation unit calculates a wavelength spectral bandwidth of the laser beam based on a detection result by said gas characteristic detecting unit.

17. A laser apparatus according to claim 15, wherein said determination unit calculates the oscillation wavelength based on the detected result.

18. A laser apparatus according to claim 16, wherein said determination unit calculates the wavelength spectral bandwidth based on the detected result.

* * * * *